United States Patent
Ni

(10) Patent No.: US 11,091,249 B2
(45) Date of Patent: Aug. 17, 2021

(54) UNMANNED AERIAL VEHICLE

(71) Applicant: AUTEL ROBOTICS CO., LTD., Guangdong (CN)

(72) Inventor: Feng Ni, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 666 days.

(21) Appl. No.: 15/845,372

(22) Filed: Dec. 18, 2017

(65) Prior Publication Data
US 2018/0194458 A1 Jul. 12, 2018

Related U.S. Application Data

(63) Continuation of application No. PCT/CN2017/099716, filed on Aug. 30, 2017.

(30) Foreign Application Priority Data

Dec. 28, 2016 (CN) .......................... 201611236880.8

(51) Int. Cl.
*B64C 25/12* (2006.01)
*B64C 25/52* (2006.01)
(Continued)

(52) U.S. Cl.
CPC .............. *B64C 25/12* (2013.01); *B64C 25/24* (2013.01); *B64C 25/52* (2013.01); *B64C 39/024* (2013.01);
(Continued)

(58) Field of Classification Search
CPC ......... B64C 25/10; B64C 25/12; B64C 25/14; B64C 2025/125
See application file for complete search history.

(56) References Cited

U.S. PATENT DOCUMENTS 2,215,598 A * 9/1940 Sznycer ................. B64C 25/52
244/102 R
2,752,112 A 6/1956 Payne, Jr.
(Continued)

FOREIGN PATENT DOCUMENTS

CN 203638090 U 6/2014
CN 104260605 A 1/2015
(Continued)

OTHER PUBLICATIONS

International Search Report dated Nov. 29, 2017; PCT/CN2017/099716 English Translation Not Yet Available on WIPO*.
(Continued)

*Primary Examiner* — Nicholas McFall

(57) ABSTRACT

Embodiments of the present invention relate to the field of aircraft technologies, and provide an unmanned aerial vehicle including an unmanned aerial vehicle body and a landing gear. The landing gear is entirely accommodated in the unmanned aerial vehicle body when being in a folded state. When being folded, the landing gear in the present invention is entirely accommodated in the unmanned aerial vehicle body, and therefore neither causes unnecessary resistance in air nor blocks an aerial photographing field of view in an aerial photographing process of the unmanned aerial vehicle. In addition, when the unmanned aerial vehicle is not in use, the landing gear is accommodated in the unmanned aerial vehicle body, so that the unmanned aerial vehicle is very compact in structure and easy to accommodate and carry.

34 Claims, 9 Drawing Sheets

(51) Int. Cl.
B64C 39/02 (2006.01)
B64C 25/24 (2006.01)
*B64C 25/32* (2006.01)

(52) U.S. Cl.
CPC .. *B64C 2025/125* (2013.01); *B64C 2025/325* (2013.01); *B64C 2201/024* (2013.01); *B64C 2201/027* (2013.01); *B64C 2201/108* (2013.01)

(56) References Cited

U.S. PATENT DOCUMENTS

| | | |
|---|---|---|
| 2015/0232181 A1 | 8/2015 | Oakley et al. |
| 2016/0159468 A1* | 6/2016 | Harris, III ............... B64C 25/52 244/102 R |

FOREIGN PATENT DOCUMENTS

| | | |
|---|---|---|
| CN | 204871591 U | 12/2015 |
| CN | 204871592 U | 12/2015 |
| CN | 205574264 U | 9/2016 |
| CN | 205707370 U | 11/2016 |
| CN | 106741876 A | 5/2017 |
| CN | 206561942 U | 10/2017 |
| GB | 478778 A | 1/1938 |
| GB | 726573 A | 3/1955 |
| RU | 1213659 C | 7/1995 |

OTHER PUBLICATIONS

European Search Report dated Feb. 25, 2019; Appln. No. EP17814291.

* cited by examiner

UNMANNED AERIAL VEHICLE

CROSS REFERENCE

This application is a continuation of International Application No. PCT/CN2017/099716, filed on Aug. 30, 2017, which claims priority to Chinese Patent Application No. 201611236880.8, filed on Dec. 28, 2016, both of which are hereby incorporated by reference in their entireties.

TECHNICAL FIELD

The present invention relates to the field of aircraft technologies, and in particular, to an unmanned aerial vehicle.

BACKGROUND

Unmanned aerial vehicles have a broad application prospect in such fields as disaster investigation and rescue, aerial monitoring, power transmission line inspection, aerial photographing, aerial survey, and military.

At present, consumer unmanned aerial vehicles on the market mainly use a fixed landing gear and a foldable landing gear. In an aerial photographing process, the fixed landing gear may block an aerial photographing field of view. The foldable landing gear usually plays only a role of not blocking an aerial photographing field of view after being retracted, and still cannot be integrated with an unmanned aerial vehicle body or accommodated into the unmanned aerial vehicle body after being retracted, causing unnecessary resistance in air and inconvenience in accommodating and carrying an unmanned aerial vehicle.

SUMMARY

To resolve the foregoing technical problems, embodiments of the present invention provide an unmanned aerial vehicle whose landing gear can be accommodated into an unmanned aerial vehicle body after being retracted.

To resolve the foregoing technical problems, the embodiments of the present invention provide the following technical solutions:

An unmanned aerial vehicle, including an unmanned aerial vehicle body and a foldable landing gear connected to the unmanned aerial vehicle body, where the landing gear is entirely accommodated in the unmanned aerial vehicle body when being in a folded state.

In an embodiment of the present invention, the landing gear includes a linkage mechanism and a power apparatus used for driving the linkage mechanism to fold or unfold, and the power apparatus is connected to the unmanned aerial vehicle body.

In an embodiment of the present invention, the linkage mechanism includes:

a support rod; and a first rotation rod, where one end of the first rotation rod is connected to the power apparatus, and the other end of the first rotation rod is hingedly connected to the support rod.

In an embodiment of the present invention, the first rotation rod includes a mounting portion connected to the power apparatus, a first connecting rod extending from the mounting portion, and a first bending portion bent and extended from the first connecting rod to extend; and one end of the support rod is hingedly connected to the first bending portion.

In an embodiment of the present invention, an angle between the first bending portion and the first connecting rod is 90°.

In an embodiment of the present invention, the unmanned aerial vehicle body is further provided with an accommodation groove used for accommodating the landing gear.

In an embodiment of the present invention, the unmanned aerial vehicle body is further provided with an accommodation groove used for accommodating the landing gear, the accommodation groove is formed by means of enclosure of a side wall of the unmanned aerial vehicle body, and the side wall is provided with an accommodation portion used for accommodating the power apparatus.

In an embodiment of the present invention, the linkage mechanism includes:

a support rod;

a first rotation rod, where one end of the first rotation rod is connected to the power apparatus, and the other end of the first rotation rod is hingedly connected to the support rod; and a cross rod connected to the support rod, where the unmanned aerial vehicle body is further provided with an accommodation groove used for accommodating the landing gear, and the accommodation groove includes a vertical portion used for accommodating the first rotation rod and the support rod and a horizontal portion used for accommodating the cross rod.

In an embodiment of the present invention, the accommodation groove is formed by means of enclosure of a side wall of the unmanned aerial vehicle body, and the side wall is provided with an accommodation portion used for the accommodating power apparatus.

In an embodiment of the present invention, the first rotation rod includes a mounting portion connected to the power apparatus, a first connecting rod extending from the mounting portion, and a first bending portion bent and extended from the first connecting rod to extend; and one end of the support rod is hingedly connected to the first bending portion.

In an embodiment of the present invention, an angle between the first bending portion and the first connecting rod is 90 degrees.

In an embodiment of the present invention, the landing gear is further provided with a buffer apparatus.

In an embodiment of the present invention, the power apparatus includes a body and a rotating shaft connected to the body, and the mounting portion is sleeved on the rotating shaft;

the landing gear further includes a buffer apparatus, where the buffer apparatus includes a first connecting body disposed on a surface that is of the mounting portion and that faces the body and an elastic component sleeved on the rotating shaft;

the first connecting body and the surface that is of the mounting portion and that faces the body jointly form a groove used for accommodating the elastic component, and the first connecting body has an opening communicating with the groove; and one end of the first connecting rod is connected to the elastic component and located in a space enclosed by the opening and a surface that is of the body and that faces the mounting portion; and one end of the elastic component is connected to the first connecting rod, and the other end of the elastic component abuts against the first connecting body.

In an embodiment of the present invention, the first connecting body is further provided with a slot communicated with the groove, and the other end of the elastic component is located in the slot and abuts against the first connecting body.

In an embodiment of the present invention, the first connecting body is of an sector ring shape, so that the opening is of a fan shape and the groove is of an annular shape, and the slot extends in a tangential direction of the groove.

In an embodiment of the present invention, the power apparatus includes a body and a rotating shaft connected to the body, the mounting portion is connected to the rotating shaft, and the mounting portion includes a first part and a second part buckled with the first part;

the landing gear further includes a buffer apparatus, where the buffer apparatus includes a first connecting body disposed on a surface that is of the first part and that faces the second part, a second connecting body disposed on a surface that is of the second part and that faces the first part, and an elastic component disposed between the first part and the second part;

the first connecting body and the first part jointly form a first groove, where a fixed column is disposed in the first groove, and the first connecting body further includes a first opening that communicates with the first groove;

the second connecting body and the second part jointly form a second groove, where an accommodation hole used for accommodating the fixed column is formed in the second groove, and the second connecting body further includes a second opening that communicates with the second groove;

the first part is buckled with the second part, so that the first groove and the second groove jointly form a groove used for accommodating the elastic component, and the first opening and the second opening jointly form an accommodation space; and one end of the first rotation rod is accommodated in the accommodation space, and one end of the elastic component is connected to the first rotation rod and the other end of the elastic component abuts against the first connecting body.

In an embodiment of the present invention, the first connecting body is further provided with a slot communicated with the first groove, and the other end of the elastic component is located in the slot and abuts against the first connecting body.

In an embodiment of the present invention, the first connecting body is of an sector ring shape, so that the first opening is of a fan shape and the first groove is of an annular shape, and the slot extends in a tangential direction of the first groove.

In an embodiment of the present invention, the second connecting body and the first connecting body have a same shape.

In an embodiment of the present invention, the first connecting body is provided with a clamping column, the second connecting body is provided with a mounting hole engaged with the clamping column, and the first connecting body is buckled with the second connecting body by means of a cooperation between the clamping column and the mounting hole.

In an embodiment of the present invention, the linkage mechanism includes at least one parallelogram mechanism.

In an embodiment of the present invention, the parallelogram mechanism includes:

a first rotation rod, where one end of the first rotation rod is connected to the power apparatus;

a second rotation rod, disposed in parallel with the first rotation rod, where one end of the second rotation rod is hingedly connected to the unmanned aerial vehicle body; and a support rod, mounted between the first rotation rod and the second rotation rod, where one end of the support rod is hingedly connected to the other end of the first rotation rod and the other end of the second rotation rod.

In an embodiment of the present invention, the first rotation rod includes a mounting portion connected to the power apparatus, a first connecting rod extending from the mounting portion, and a first bending portion bent and extended from a tail end of the first connecting rod;

the second rotation rod includes a second connecting rod whose one end is hingedly connected to the unmanned aerial vehicle body and a second bending portion bent and extended from a tail end of the second connecting rod; and the first bending portion and the second bending portion are both hingedly connected to the support rod.

In an embodiment of the present invention, an angle between the first bending portion and the first connecting rod is 90°; and an angle between the second bending portion and the second connecting rod is 90°.

In an embodiment of the present invention, projections of the first rotation rod and the second rotation rod onto a plane parallel to axes of the first rotation rod and the second rotation rod are not overlapped.

In an embodiment of the present invention, the linkage mechanism further includes a connecting pin, an axis of the connecting pin is perpendicular to an axis of the second rotation rod, one end of the connecting pin is connected to the unmanned aerial vehicle body, and the other end of the connecting pin is hingedly connected to the second rotation rod.

In an embodiment of the present invention, the unmanned aerial vehicle body is further provided with an accommodation groove used for accommodating the landing gear.

In an embodiment of the present invention, the unmanned aerial vehicle body is further provided with an accommodation groove used for accommodating the landing gear, the accommodation groove is formed by means of enclosure of a side wall of the unmanned aerial vehicle body, and the side wall is provided with an accommodation portion used for accommodating the power apparatus.

In an embodiment of the present invention, the linkage mechanism includes:

a first rotation rod, where one end of the first rotation rod is connected to the power apparatus;

a second rotation rod, disposed in parallel with the first rotation rod, where one end of the second rotation rod is hingedly connected to the unmanned aerial vehicle body;

a support rod, mounted between the first rotation rod and the second rotation rod, where one end of the support rod is hingedly connected to the other ends of the first rotation rod and the second rotation rod; and a cross rod, connected to the support rod, where the unmanned aerial vehicle body is further provided with an accommodation groove used for accommodating the landing gear, and the accommodation groove includes a vertical portion used for accommodating the first rotation rod, the second rotation rod, and the support rod and a horizontal portion used for accommodating the cross rod.

In an embodiment of the present invention, the accommodation groove is formed by means of enclosure of a side wall of the unmanned aerial vehicle body, and the side wall is provided with an accommodation portion used for accommodating the power apparatus.

In an embodiment of the present invention, the first rotation rod includes a mounting portion connected to the power apparatus, a first connecting rod extending from the mounting portion, and a first bending portion bent and extended from a tail end of the first connecting rod;

the second rotation rod includes a second connecting rod whose one end is hingedly connected to the unmanned aerial vehicle body and a second bending portion bent and extended from a tail end of the second connecting rod; and the first bending portion and the second bending portion are both hingedly connected to the support rod.

In an embodiment of the present invention, an angle between the first bending portion and the first connecting rod is 90°; and an angle between the second bending portion and the second connecting rod is 90°.

In an embodiment of the present invention, projections of the first rotation rod and the second rotation rod onto a plane parallel to axes of the first rotation rod and the second rotation rod are not overlapped.

In an embodiment of the present invention, the linkage mechanism further includes a connecting pin, an axis of the connecting pin is perpendicular to an axis of the second rotation rod, one end of the connecting pin is connected to the unmanned aerial vehicle body, and the other end of the connecting pin is hingedly connected to the second rotation rod.

In an embodiment of the present invention, the landing gear is further provided with a buffer apparatus.

In an embodiment of the present invention, the power apparatus includes a body and a rotating shaft connected to the body, and the mounting portion is sleeved on the rotating shaft;

the landing gear further includes a buffer apparatus;

the buffer apparatus includes a first connecting body disposed on a surface that is of the mounting portion and that faces the body and an elastic component sleeved on the rotating shaft;

the first connecting body and the surface that is of the mounting portion and that faces the body jointly form a groove used for accommodating the elastic component, and the first connecting body has an opening that communicates with the groove; and one end of the first connecting rod is connected to the elastic component and located in a space enclosed by the opening and a surface that is of the body and that faces the mounting portion; and one end of the elastic component is connected to the first connecting rod, and the other end of the elastic component abuts against the first connecting body.

In an embodiment of the present invention, the first connecting body is further provided with a slot communicated with the groove, and the other end of the elastic component is located in the slot and abuts against the first connecting body.

In an embodiment of the present invention, the first connecting body is of an sector ring shape, so that the opening is of a fan shape and the groove is of an annular shape, and the slot extends in a tangential direction of the groove.

In an embodiment of the present invention, the power apparatus includes a body and a rotating shaft connected to the body, the mounting portion is connected to the rotating shaft, and the mounting portion includes a first part and a second part buckled with the first part;

the landing gear further includes a buffer apparatus, where the buffer apparatus includes a first connecting body disposed on a surface that is of the first part and that faces the second part, a second connecting body disposed on a surface that is of the second part and that faces the first part, and an elastic component disposed between the first part and the second part;

the first connecting body and the first part jointly form a first groove, where a fixed column is disposed in the first groove, and the first connecting body further includes a first opening that communicates with the first groove;

the second connecting body and the second part jointly form a second groove, where an accommodation hole used for accommodating the fixed column is formed in the second groove, and the second connecting body further includes a second opening that communicates with the second groove;

the first part is buckled with the second part, so that the first groove and the second groove jointly form a groove used for accommodating the elastic component, and the first opening and the second opening jointly form an accommodation space; and one end of the first rotation rod is accommodated in the accommodation space, and one end of the elastic component is connected to the first rotation rod and the other end of the elastic component abuts against the first connecting body.

In an embodiment of the present invention, the first connecting body is further provided with a slot communicated with the first groove, and the other end of the elastic component is located in the slot and abuts against the first connecting body.

In an embodiment of the present invention, the first connecting body is of an sector ring shape, so that the first opening is of a fan shape and the first groove is of an annular shape, and the slot extends in a tangential direction of the first groove.

In an embodiment of the present invention, the second connecting body and the first connecting body have a same shape.

In an embodiment of the present invention, the first connecting body is provided with a clamping column, the second connecting body is provided with a mounting hole engaged with the clamping column, and the first connecting body is buckled with the second connecting body by means of a cooperation between the clamping column and the mounting hole.

Compared with the prior art, in the embodiments of the present invention, when being folded, the landing gear of the unmanned aerial vehicle is entirely accommodated in the unmanned aerial vehicle body, and therefore neither causes unnecessary resistance in air nor blocks an aerial photographing field of view in an aerial photographing process of the unmanned aerial vehicle. In addition, when the unmanned aerial vehicle is not in use, the landing gear is entirely accommodated in the unmanned aerial vehicle body, so that the unmanned aerial vehicle is very compact in structure and easy to accommodate and carry.

BRIEF DESCRIPTION OF THE DRAWINGS

One or more embodiments are exemplarily described by using figures that are corresponding thereto in the accompanying drawings. The exemplary descriptions do not constitute a limitation to the embodiments. Elements with same reference numbers in the accompanying drawings indicate similar elements. Unless otherwise particularly stated, the figures in the accompanying drawings do not constitute a scale limitation.

DETAILED DESCRIPTION

For ease of understanding the present invention, the present invention is described in more details below with reference to the accompanying drawings and specific embodiments. It should be noted that when an element is described as being "fixed" on another element, the element may be directly on the another element, or one or more intermediate elements may exist therebetween. When an element is described as being "connected" to another element, the element may be directly connected to the another element, or one or more intermediate elements may exist therebetween. Terms such as "perpendicular", "horizontal", "left", "right" and similar expressions used in this specification are merely used for the purpose of description.

Unless otherwise defined, all technical and scientific terms used in this specification are the same as meanings usually understood by persons skilled in the technical field belonging to the present invention. The terms used in this specification of the present invention are merely intended to describe specific embodiments rather than limit the present invention. A term "and/or" used in this specification includes any or all combinations of one or more related listed items.

Figure 1:
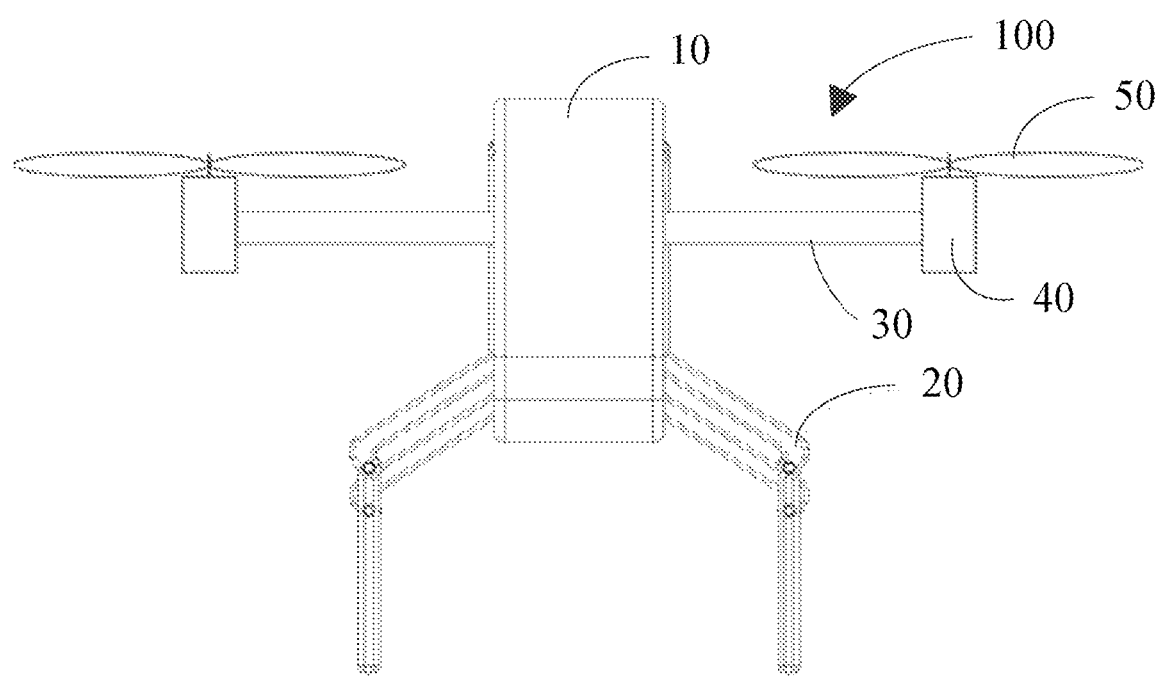
FIG. 1 is a front view of an unmanned aerial vehicle according to an embodiment of the present invention.
Figure 2:
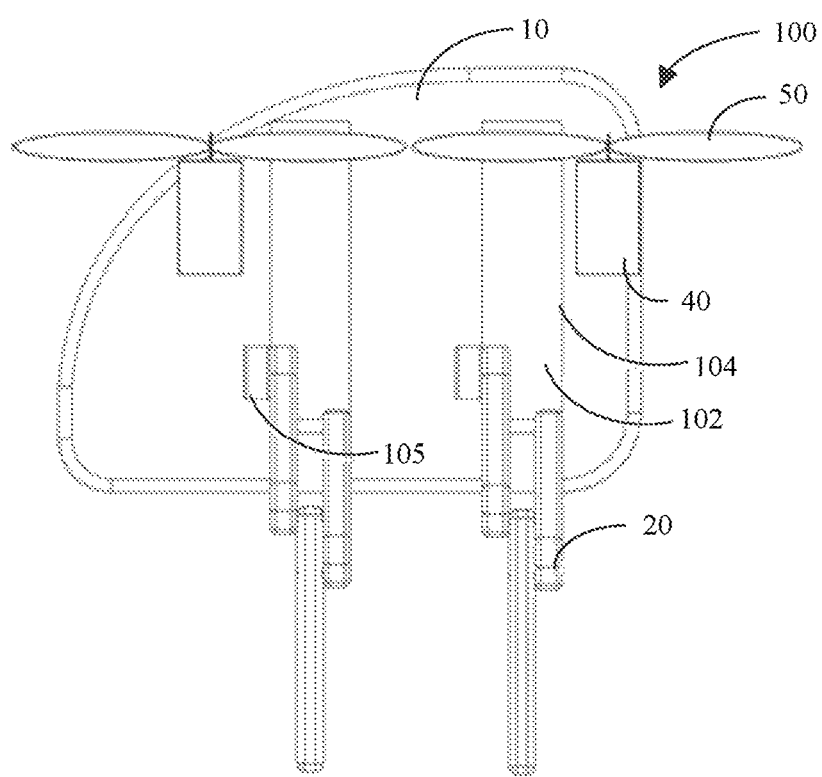
FIG. 2 is a side view of the unmanned aerial vehicle shown in FIG. 1.

Referring to FIG. 1 and FIG. 2, FIG. 1 and FIG. 2 show an unmanned aerial vehicle 100 according to an embodiment of the present invention. In this embodiment, the unmanned aerial vehicle 100 may be single-rotor, dual-rotor, quad-rotor, hex-rotor, or the like. A detailed description is provided herein by using a quad-rotor unmanned aerial vehicle as an example.

The unmanned aerial vehicle 100 includes an unmanned aerial vehicle body 10, a landing gear 20, an arm 30, a motor 40, and a rotor 50. The rotor 50 is mounted on the motor 40, the motor 40 is mounted on one end of the arm 30, the other end of the arm 30 is mounted on the unmanned aerial vehicle body 10, and the landing gear 20 is mounted on the unmanned aerial vehicle body 10 and used for supporting the unmanned aerial vehicle 100 on a landing location when the unmanned aerial vehicle 100 lands.

The unmanned aerial vehicle body 10 includes a control circuit assembly including electronic parts and components such as an MCU. The control circuit assembly includes a plurality of control modules, for example, a control module used for controlling the landing gear 20 to retract and extend, a flight control module used for controlling a flight gesture of the unmanned aerial vehicle, a BeiDou module used for navigating the unmanned aerial vehicle, and a data processing module used for processing environment information obtained by a related on-board device. Each of two opposite sides of the unmanned aerial vehicle body 10 is provided with two accommodation grooves 102 used for accommodating the retracted landing gears 20. In this embodiment of the present invention, the number of the landing gear 20 is four, each side is provided with two landing gears 20, and each accommodation groove 102 correspondingly accommodates one landing gear 20. In some other embodiments, the landing gear 20 may be added on each side according to a requirement. For example, each side is provided with three or four landing gears 20. In another possible embodiment, the unmanned aerial vehicle body 10 may not be provided with accommodation groove, and the landing gear are directly accommodated in the unmanned aerial vehicle body 10 as long as place for the landing gear is reserved during design of the unmanned aerial vehicle body. Setting the accommodation grooves 102 on the unmanned aerial vehicle body 10 does not occupy an internal space of the unmanned aerial vehicle body nor causes interference to the parts and components in the unmanned aerial vehicle body 10, and makes the structure of the unmanned aerial vehicle body 10 more compact.

Figure 3:
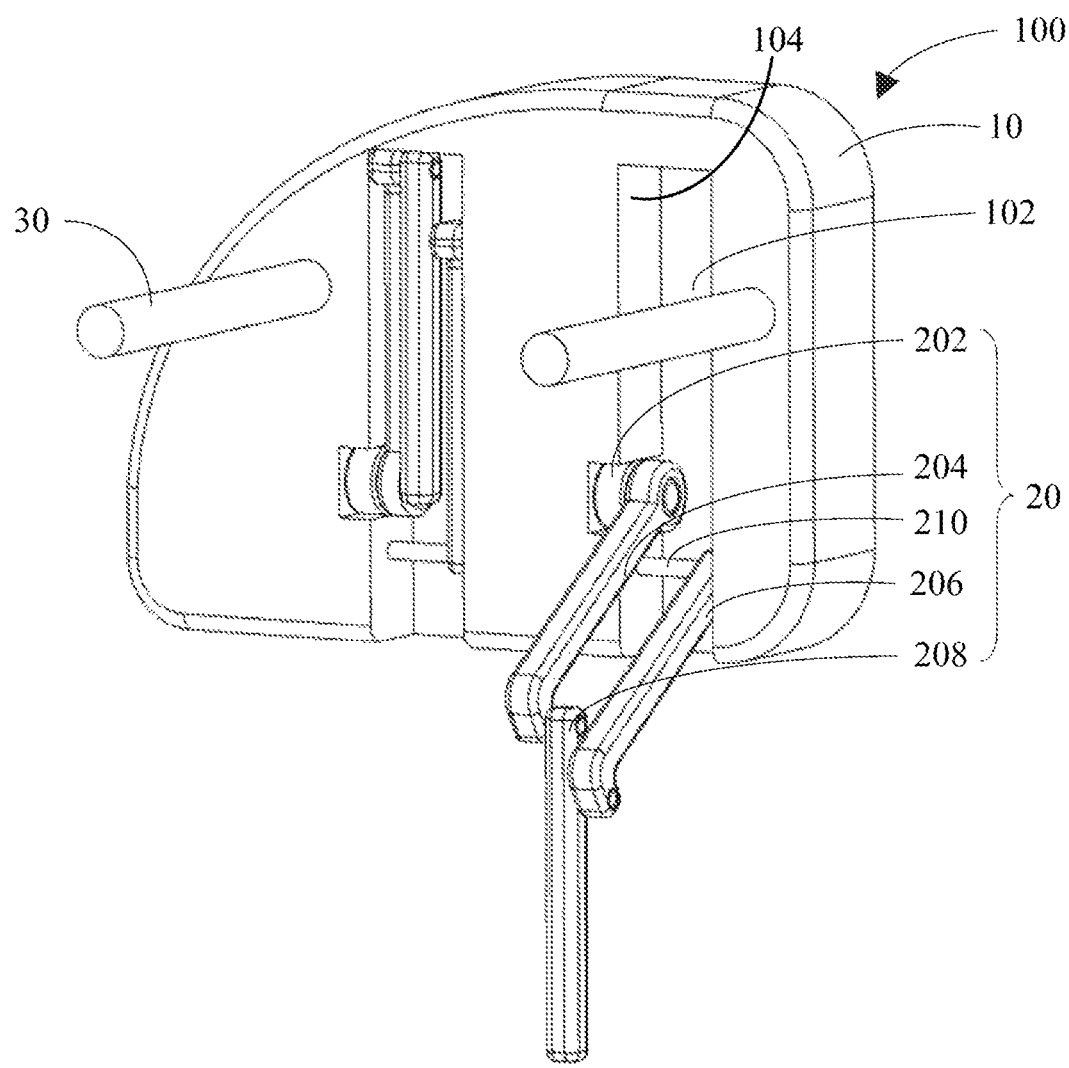
FIG. 3 is a schematic diagram of an unmanned aerial vehicle body and a landing gear of the unmanned aerial vehicle according to the embodiment of the present invention.

As shown in FIG. 2 and FIG. 3, each accommodation groove 102 is of a strip shape and vertically disposed, and is formed by means of enclosure of a side wall 104. Thereinto, the side wall 104 is further recessed to form a groove 105.

Figure 4:
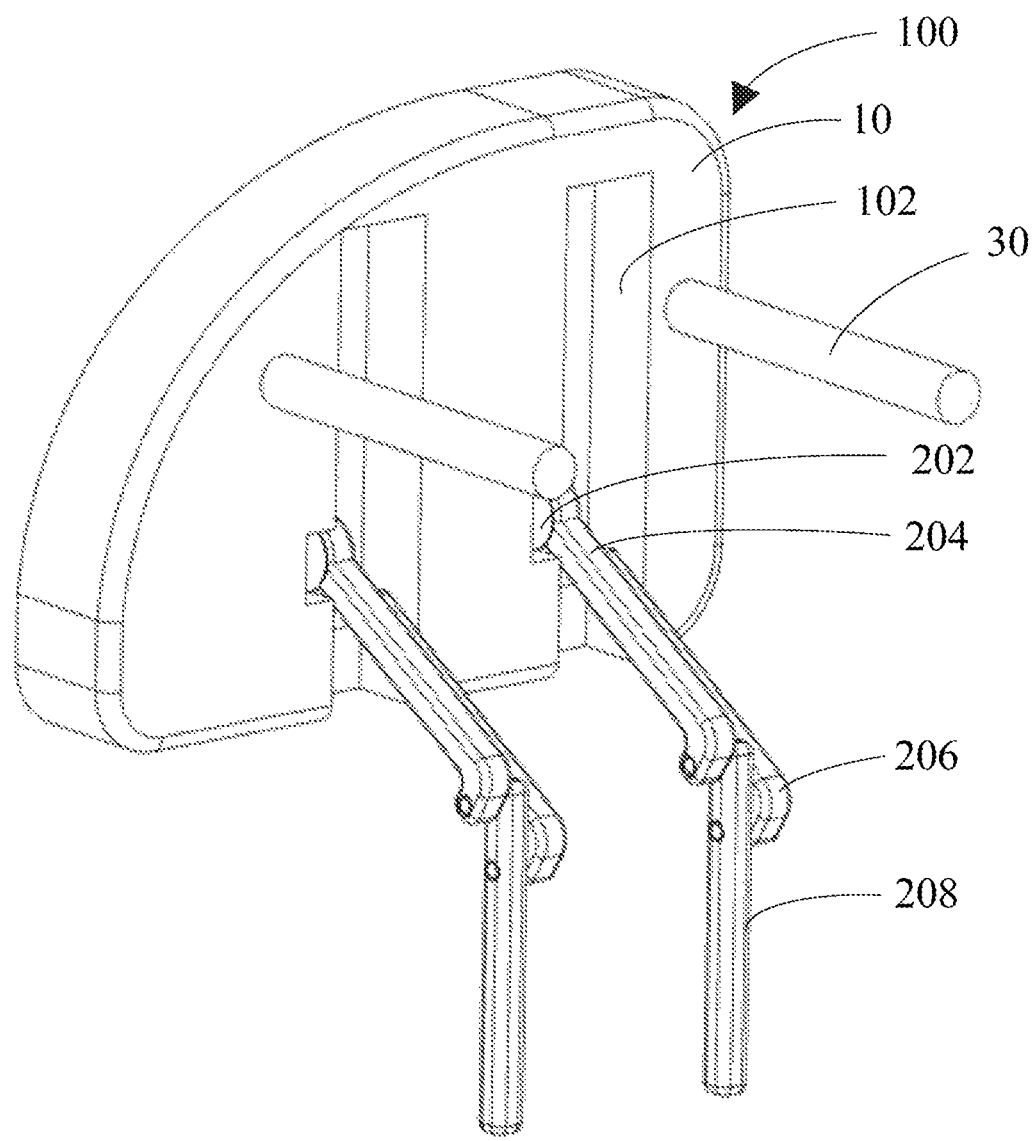
FIG. 4 is a schematic diagram of the unmanned aerial vehicle body and the landing gear of the unmanned aerial vehicle in another perspective according to the embodiment of the present invention.
Figure 5:
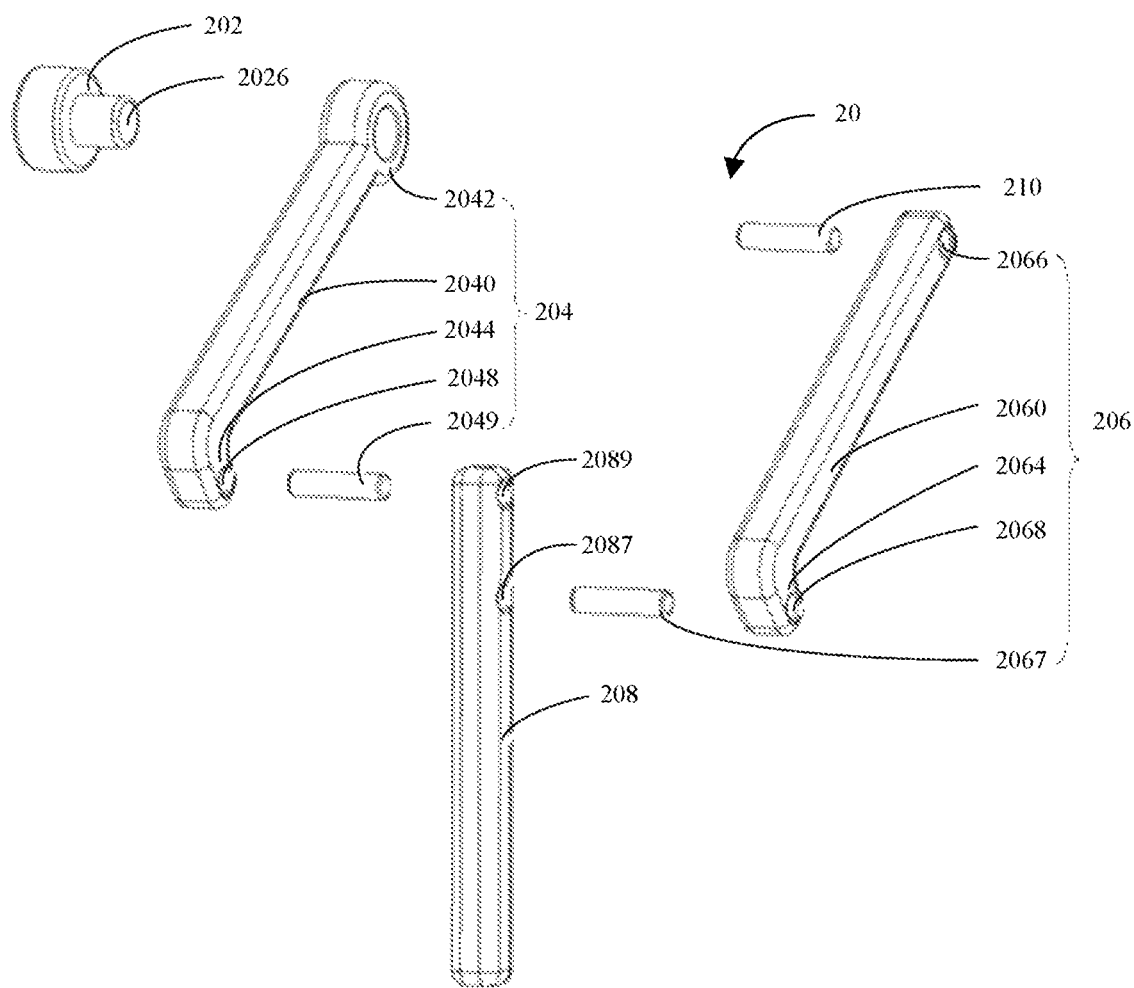
FIG. 5 is an exploded view of the landing gear of the unmanned aerial vehicle according to the embodiment of the present invention.

Referring to FIG. 3, FIG. 4, and FIG. 5, each landing gear 20 includes a linkage mechanism and a power apparatus driving the linkage mechanism to fold or extend.

The above-mentioned power apparatus is mounted in the groove 105 of the side wall 104, and includes a body 202 and a rotating shaft 2026. A central axis of the rotating shaft 2026 is horizontally arranged.

In this embodiment, the power apparatus includes a steering engine. The steering engine includes an automatic control system including a direct current motor, a reduction gear set, a sensor, and a control circuit. The power apparatus may alternatively use a stepping motor, a direct current motor, an alternating current motor, or the like. The MCU in the unmanned aerial vehicle body 10 may control, by sending a signal, the rotating shaft 2026 to rotate by a specified angle.

In an embodiment of the present invention, the linkage mechanism includes at least one parallelogram mechanism. Further, the linkage mechanism in this embodiment includes a first rotation rod 204, a second rotation rod 206, and a support rod 208. Projections of the first rotation rod 204 and the second rotation rod 206 onto a horizontal plane parallel to axes of the first rotation rod 204 and the second rotation rod 206 are not overlapped. By means of such a non-overlapped arrangement, the landing gear can have a higher strength.

Thereinto, the first rotation rod 204 is connected to the rotating shaft 2026 of the power apparatus and driven to rotate by the power apparatus. One end of the second rotation rod 206 is hingedly connected to the unmanned aerial vehicle body, and one end of the support rod 208 is hingedly connected to the other ends of the first rotation rod 204 and the second rotation rod 206. The first rotation rod 204, the second rotation rod 20, and the support rod 208 jointly form a parallelogram mechanism. The first rotation rod 204 is an active rod, and the second rotation rod 206 is a driven rod. Driven by the first rotation rod 204 and the second rotation rod 206, the support rod 208 may reduce shake in a retraction or an extension process. The parallelogram mechanism has such advantages as a long stroke, flexible movement, high stability, high strength, and a simple structure, and can make the structure of a folded landing gear more compact after being applied to the landing gear.

In another possible embodiment, the linkage mechanism may only include the first rotation rod and the support rod.

The first rotation rod 204 includes a mounting portion 2042, a first connecting rod 2040 extending from the mounting portion 2042, and a first bending portion 2044 extending from the first connecting rod 2040. The mounting portion 2042 is disposed on one end of the first connecting rod 2040. The first bending portion 2044 extends from the other end of the first connecting rod 2040, and forms a first angle with the first connecting rod 2040. The first bending portion 2044 is provided with a first accommodation hole 2048.

The second rotation rod 206 includes a second connecting rod 2060 and a second bending portion 2064 extending from the second connecting rod 2060. One end of the second connecting rod 2060 is provided with a pin hole 2066. The second bending portion 2064 extends from the other end of the second connecting rod 2060 and forms a second angle with the second connecting rod 2060. The second bending portion 2064 is provided with a second accommodation hole 2068. The first angle is equal to the second angle. In this embodiment, the first angle and the second angle are both 90 degrees. In some other embodiments, the first angle and the second angle may be other degrees.

The linkage mechanism further includes a connecting pin 210. One end of the connecting pin 210 is accommodated in the connecting pin hole 2066, and the other end of the connecting pin 210 is mounted on the side wall 104. The second rotation rod 206 is hingedly connected to the unmanned aerial vehicle body 10 by using the connecting pin 210.

The above-mentioned support rod 208 is used for supporting the unmanned aerial vehicle 100 on the landing location, and one end of the support rod 208 is movably connected to the first bending portion 2044 and the second bending portion 2064 and sandwiched between the first bending portion 2044 and the second bending portion 2064. The support rod 208 is provided with a third accommodation hole 2089 and a fourth accommodation hole 2087. The linkage mechanism further includes a first pin roll 2049 and a second pin roll 2067. One end of the first pin roll 2049 is movably mounted in the first accommodation hole 2048, and the other end of the first pin roll 2049 is movably mounted in the third accommodation hole 2089. One end of the second pin roll 2067 is movably mounted in the second accommodation hole 2068, and the other end of the second pin roll 2067 is movably mounted in the fourth accommodation hole 2087.

In this embodiment, the first rotation rod 204 is provided with the first bending portion 2044, and the second rotation rod 206 is provided with the second bending portion 2064, so that the landing gear 20 has a more compact structure after retracting.

In some other embodiments, the first bending portion 2044 and the second bending portion 2064 may be omitted, and the first connecting rod 2040 and the second connecting rod 2060 are directly and movably connected to the support rod 208.

In another possible embodiment, the linkage mechanism may further include a cross rod connected to the support rod 208. An axis of the cross rod is perpendicular to an axis of the support rod 208. The cross rod can further improve the supporting stability of the landing gear.

When the unmanned aerial vehicle 100 takes off, the MCU in the unmanned aerial vehicle body 10 controls the rotating shaft 2026 to rotate, to drive the first rotation rod 204 to rotate towards the accommodation groove 102 around a central axis of the rotating shaft 2026. Driven by the first rotation rod 204, the second rotation rod 206 also rotates towards the accommodation groove 102 around the connecting pin 210. Driven by the first rotation rod 204 and the second rotation rod 206, the support rod 208 retracts. When the first rotation rod 204, the second rotation rod 206, and the support rod 208 are entirely accommodated in the accommodation groove 102, the rotating shaft 2026 stops rotating.

When the unmanned aerial vehicle 100 lands, the MCU in the unmanned aerial vehicle body 10 controls the rotating shaft 2026 to rotate, to drive the first rotation rod 204 to rotate around the central axis of the rotating shaft 2026 in a direction away from the accommodation groove 102. Driven by the first rotation rod 204, the second rotation rod 206 also rotates around the connecting pin 210 in the direction away from the accommodation groove 102.

Driven by the first rotation rod 204 and the second rotation rod 206, the support rod 208 is detached from the accommodation groove 102. When the support rod 208 reaches a support position, the rotating shaft 2026 stops rotating. At this moment, free ends of four support rods 208 of the four landing gears 20 are located on a same horizontal plane, to support the unmanned aerial vehicle 100 in the landing location.

Compared with the prior art, the landing gear 20 in the present invention can be entirely accommodated in the accommodation groove 102 when being folded, and therefore neither causes unnecessary resistance in air nor blocks an aerial photographing field of view in an aerial photographing process of the unmanned aerial vehicle 100. In addition, when the unmanned aerial vehicle 100 is not in use, the landing gear 20 is entirely accommodated in the accommodation groove 102, so that the unmanned aerial vehicle is very compact in structure and easy to accommodate and carry.

In some embodiments, the landing gear 20 may further include a buffer apparatus. The buffer apparatus may be a buffer spring, an air cylinder buffer apparatus, a hydraulic buffer apparatus, an oil pressure buffer apparatus, or the like. The buffer apparatus may be mounted on one or more of the first rotation rod 204, the second rotation rod 206, and the support rod 208. After the landing gear 20 of the unmanned aerial vehicle 100 is in contact with the ground, the landing gear 20 may rotate under a force. The buffer apparatus can provide a torsional elastic force, so that the landing gear 20 plays a role of buffering and damping, thereby avoiding damage of the unmanned aerial vehicle 100 due to an excessively fast landing speed during landing.

Figure 6:
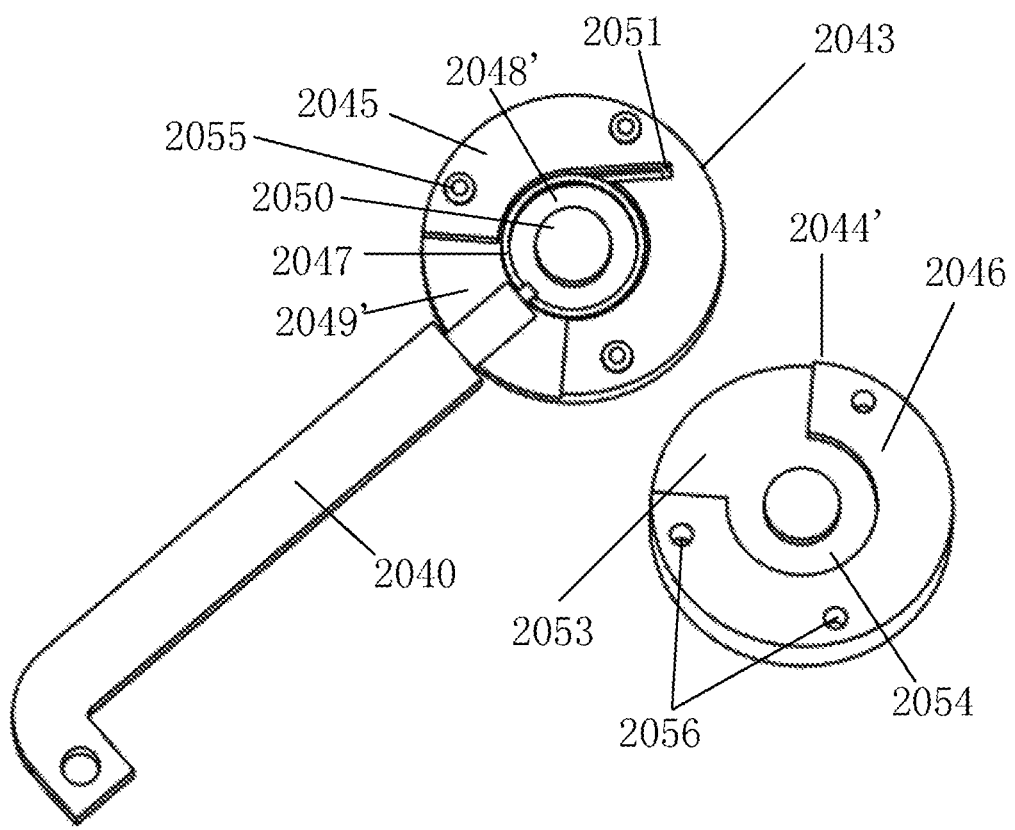
FIG. 6 is an exploded view of a first rotation rod of the landing gear shown in FIG. 5.

Referring to FIG. 6, in an embodiment of the present invention, the buffer apparatus is disposed on the first rotation rod 204. The mounting portion 2042 includes a first part 2043 and a second part 2044' that are buckled with each other.

The buffer apparatus includes a first connecting body 2045 disposed on a surface that is of the first part 2043 and that faces the second part 2044', a second connecting body 2046 disposed on a surface that is of the second part 2044' and that faces the first part 2043, and an elastic component 2047 disposed between the first part 2043 and the second part 2044'. The elastic component 2047 may be a torque spring, a spring plate, or the like.

The first connecting body 2045 is of an sector ring shape, and jointly forms, with the surface that is of the first part 2043 and that faces the second part 2044', a first groove 2048' and a first opening 2049' communicated with the first groove 2048'. The center of the first groove 2048' is further provided with a fixed column 2050. Because the first connecting body 2045 is of an sector ring shape, the first groove 2048' is of a circular shape, and the first opening 2049' is of a fan shape. In addition, the first connecting body 2045 is further provided with a long and narrow slot 2051, and the slot 2051 extends in a tangential direction of the first groove 2048' and is communicated with the first groove 2048'. The elastic component 2047 is sleeved on the fixed column 2050, and one end of the elastic component 2047 is located in the slot 2051 and abuts against the first connecting body 2045. In another possible embodiment, the first connecting body 2045 may be of another shape as long as the first connecting body 2045 can jointly form an opening and a groove with the surface of the first part 2043. In addition, in another possible embodiment, the first connecting body 2045 may further be integrated with the first part 2043.

The shape of the second connecting body 2046 is the same as the shape of the first connecting body 2045 and is also an sector ring shape. The second connecting body 2046 jointly forms, with a surface that is of the second part 2044' and that faces the first part 2043, a second groove 2052 and a second opening 2053 communicated with the second groove 2052. The center of the second part 2044' is provided with an accommodation hole 2054 used for accommodating the fixed column 2050. In another possible embodiment, the second connecting body 2046 may be of another shape, as long as the shape thereof is the same as the shape of the first connecting body 2045. In addition, in another possible embodiment, the second connecting body 2046 may further be integrated with the second part 2044'.

In addition, the first connecting body 2045 is provided with a plurality of clamping columns 2055, and the second connecting body 2046 is provided with a plurality of mounting holes 2056. The first part 2043 and the second part 2044' are buckled with each other by means of engagement of the clamping columns 2055 and the mounting holes 2056. By means of a buckled connection manner, the structure is simple and mounting is facilitated. It may be understood that the first part 2043 and the second part 2044' may be connected in another connection manner, for example, bonding, threaded connection, or welding.

After the first part 2043 is buckled with the second part 2044', the first opening 2049' and the second opening 2053 are disposed opposite to each other, and the first groove 2048' and the second groove 2054 are disposed opposite to each other, so as to form a groove used for accommodating the elastic component 2047 and a fan-shaped accommodation space. One end of the first connecting rod 2040 is accommodated in the accommodation space and is connected to the elastic component 2047, and may move in a range defined by the accommodation space.

In another possible embodiment, the buffer apparatus may only include the first connecting body and the elastic component. The first connecting body is directly disposed on a surface that is of the mounting portion and that faces the power apparatus, and the shape and the structure of the first connecting body are the same as the shape and the structure described above. In this case, the center of the mounting portion has no fixed column but is provided with a through hole for running through by the rotating shaft. The elastic component may be directly sleeved on the rotating shaft. The first connecting body and a surface that is of the body of the power apparatus and that faces the mounting portion jointly form an accommodation space used for accommodating one end of the first connecting rod and a groove used for accommodating the elastic component.

Figure 7:
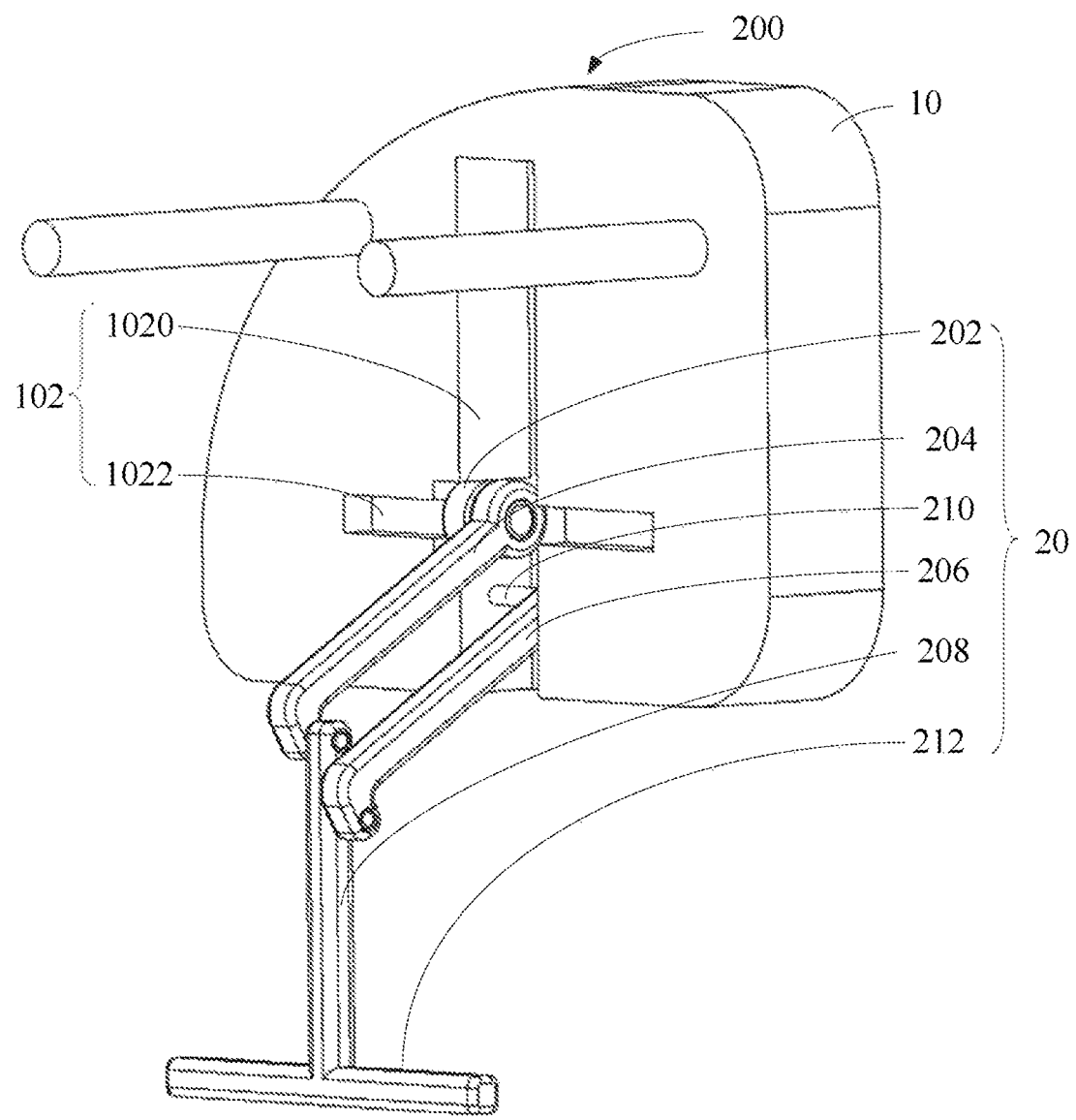
FIG. 7 is a schematic diagram of an unmanned aerial vehicle body and a landing gear of the unmanned aerial vehicle according to another embodiment of the present invention, wherein the landing gear is in an extending state.
Figure 8:
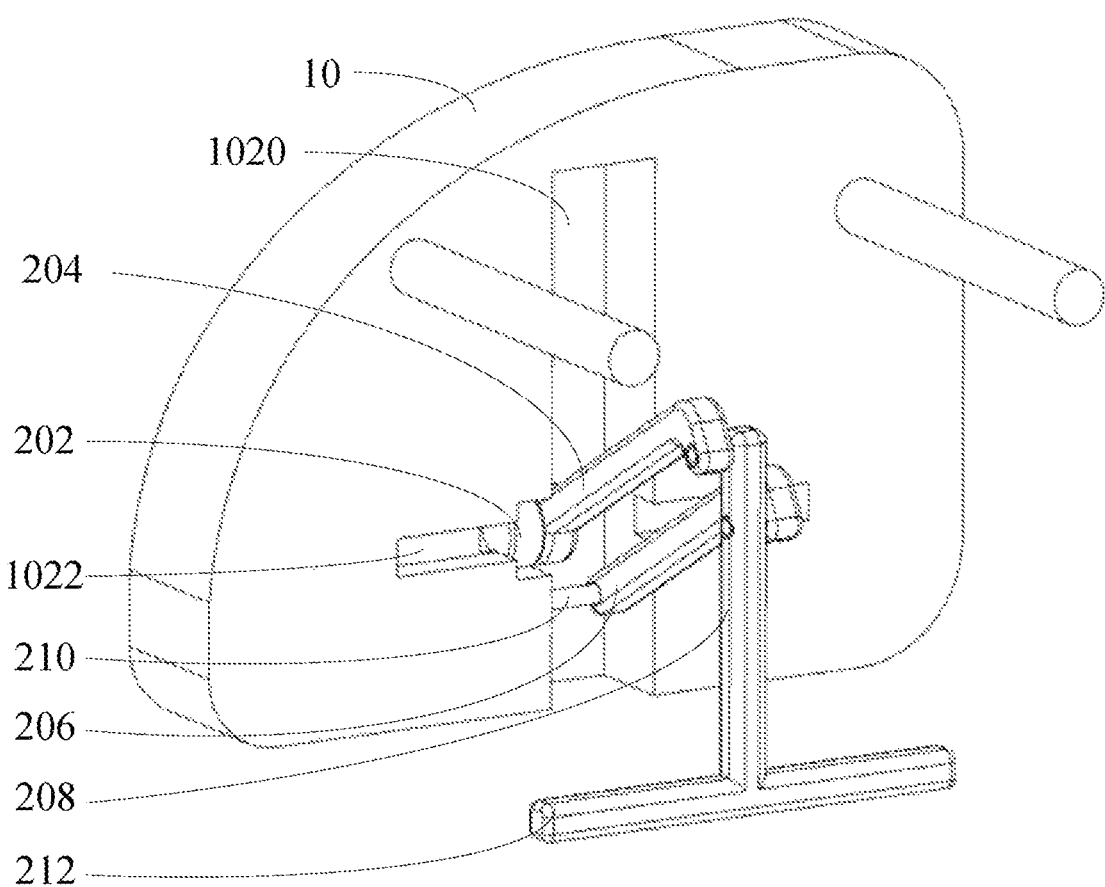
FIG. 8 is a schematic diagram of the unmanned aerial vehicle body and the landing gear of the unmanned aerial vehicle according to the embodiment of the present invention, wherein the landing gear is retracting.
Figure 9:
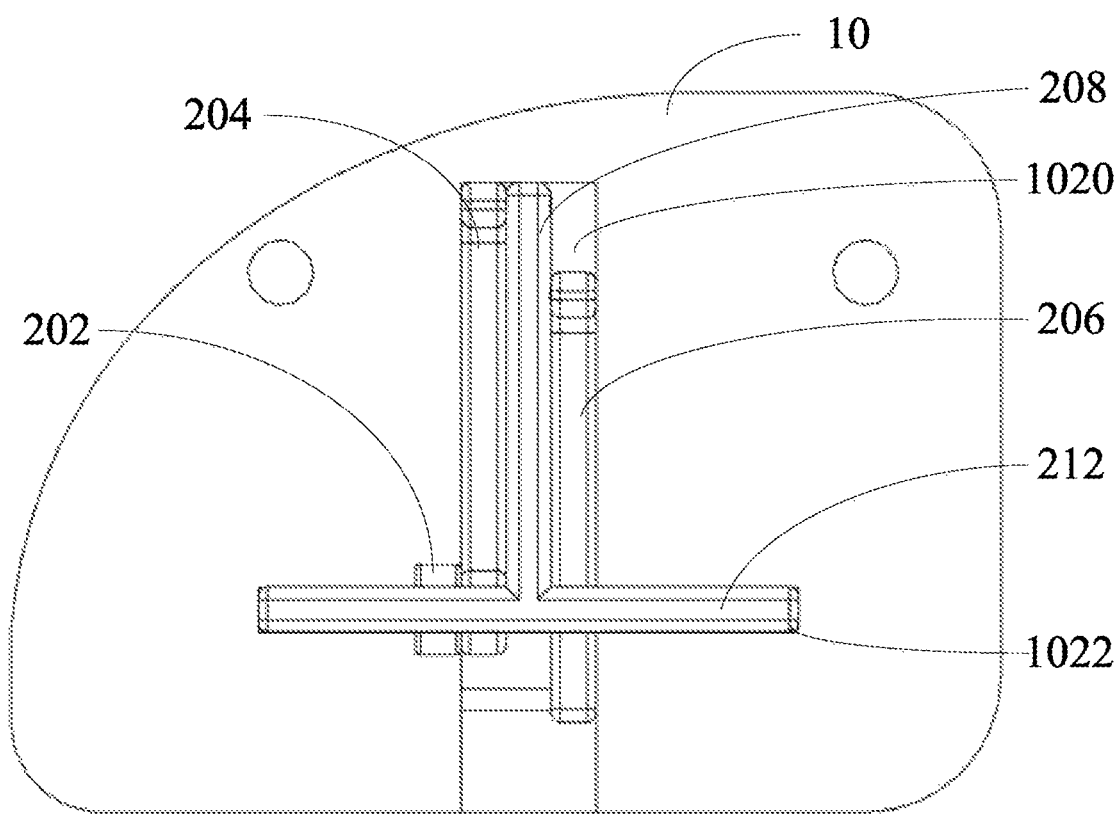
FIG. 9 is a schematic diagram of the unmanned aerial vehicle body and the landing gear of the unmanned aerial vehicle according to the embodiment of the present invention, wherein the landing gear is in a retracting state.

Referring to FIG. 7, FIG. 8, and FIG. 9, a unmanned aerial vehicle 200 provided in another embodiment of the present invention is basically the same as the unmanned aerial vehicle 100 provided in the above-mentioned embodiment, and a difference is that: two opposite sides of a unmanned aerial vehicle body 10 are each provided with an accommodation groove 102, the accommodation groove 102 includes a vertical portion 1020 and a horizontal portion 1022. The vertical portion 1020 and the horizontal portion 1022 are communicated with each other and roughly disposed in a cross shape. There are two landing gears 20, and each side of the unmanned aerial vehicle body 10 is provided with one landing gear 20. A support rod 208 of each landing gear 20 is connected to a cross rod 212, and the cross rod 212 is horizontally disposed. Two cross rods 212 of the two landing gears 20 are disposed in parallel. Each landing gear 20 is provided with a cross rod 212 and two cross rods 212 of the two landing gears 20 are disposed in parallel, so as to more stably support the unmanned aerial vehicle 200 in a landing location.

When the unmanned aerial vehicle 200 takes off, an MCU in the unmanned aerial vehicle body 10 controls a rotating shaft 2026 to rotate, to drive a first rotation rod 204 to rotate towards the accommodation groove 102 around a central axis of the rotating shaft 2026. Driven by the first rotation rod 204, a second rotation rod 206 also rotates towards the accommodation groove 102 around a connecting pin 210. Driven by the first rotation rod 204 and the second rotation rod 206, the support rod 208 and the cross rod 212 retract. When the first rotation rod 204, the second rotation rod 206, and the support rod 208 are accommodated in the vertical portion 1020, and the cross rod 212 is accommodated in the horizontal portion 1022, the rotating shaft 2026 stops rotating.

When the unmanned aerial vehicle 200 lands, the MCU in the unmanned aerial vehicle body 10 controls the rotating shaft 2026 to rotate, to drive the first rotation rod 204 to rotate around the central axis of the rotating shaft 2026 in a direction away from the accommodation groove 102. Driven by the first rotation rod 204, the second rotation rod 206 also rotates around the connecting pin 210 in the direction away from the accommodation groove 102. Driven by the first rotation rod 204 and the second rotation rod 206, the support rod 208 is detached from the vertical portion 1020, and the cross rod 212 is detached from the horizontal portion 1022. When the cross rod 212 reaches a support position, the rotating shaft 2026 stops rotating. In this case, the two cross rods 212 of the two landing gears 20 are located on a same horizontal plane, to support the unmanned aerial vehicle 200 in the landing location.

In this embodiment of the present invention, the unmanned aerial vehicle body 10 is provided with the accommodation groove 102. When the unmanned aerial vehicle 200 takes off, the landing gear 20 retracts and is accommodated in the vertical portion 1020 and the horizontal portion 1022, and therefore neither causes unnecessary resistance in air nor blocks an aerial photographing field of view in an aerial photographing process of the unmanned aerial vehicle 200. In addition, when the unmanned aerial vehicle 200 is not in use, the landing gear 20 is accommodated in the vertical portion 1020 and the horizontal portion 1022, so that the unmanned aerial vehicle is very compact in structure and easy to accommodate and carry.

In some embodiments, each side of the unmanned aerial vehicle body 10 may be provided with two accommodation grooves 102. Each accommodation groove 102 includes a vertical portion 1020, and vertical portions 1020 of the two accommodation grooves 102 are connected to a same horizontal portion 1022. The horizontal portion 1022 is disposed between the two vertical portions 1020, and is communicated with the two vertical portions 1020. The horizontal portion 1022 and the two vertical portions 1020 are roughly disposed in an H shape. One landing gear 20 in the abovementioned embodiment shown in FIG. 1 to FIG. 5 is mounted in each of the two vertical portions 1020. Two landing gears 20 on a same side of the unmanned aerial vehicle body 10 share one cross rod 212, that is, two ends of the cross rod 212 may be connected between end portions of two support rods 208, or may be connected between middle parts of the two support rods 208.

Alternatively, two ends of the horizontal portion 1022 run through the two vertical portions 1020, and two landing gears 20 on a same side of the unmanned aerial vehicle body 10 share one cross rod 212, that is, end portions of two support rods 208 are connected to the cross rod 212.

When the landing gear 20 retracts, the vertical portion 1020 accommodates the first rotation rod 204, the second rotation rod 206, and the support rod 208, and the horizontal portion 1022 accommodates the cross rod 212.

By using a structure in which two support rods 208 are connected to one cross rod 212, the stability of the landing gears 20 may be improved. In addition, when one of the two landing gears 20 has a motor fault, the landing gear 20 can still retracts and extends normally.

At last, it should be noted that the foregoing embodiments are merely intended to describe the technical solutions of the present invention rather than limit the technical solutions of the present invention. In the ideas of the present invention, technical features between the foregoing embodiments or different embodiments may be combined, steps may be performed in any sequence, and many other changes of the foregoing descriptions in different aspects of the present invention exist. For brevity, the changes are not provided in details. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An unmanned aerial vehicle, comprising an unmanned aerial vehicle body and a foldable landing gear connected to the unmanned aerial vehicle body, wherein the landing gear is entirely accommodated in the unmanned aerial vehicle body when being in a folded state;
wherein the landing gear comprises a linkage mechanism and a power apparatus used for driving the linkage mechanism to fold or unfold, and the power apparatus is connected to the unmanned aerial vehicle body;
wherein the linkage mechanism comprises at least one parallelogram mechanism;
wherein the parallelogram mechanism comprises:
a first rotation rod, wherein one end of the first rotation rod is connected to the power apparatus;
a second rotation rod, disposed in parallel with the first rotation rod, wherein one end of the second rotation rod is hingedly connected to the unmanned aerial vehicle body; and
a support rod, mounted between the first rotation rod and the second rotation rod, wherein one end of the support rod is hingedly connected to the other end of the first rotation rod and the other end of the second rotation rod;
wherein the first rotation rod comprises a mounting portion connected to the power apparatus, a first connecting rod extending from the mounting portion, and a first bending portion bent at a tail end of the first connecting rod to extend;
the second rotation rod comprises a second connecting rod whose one end is hingedly connected to the unmanned aerial vehicle body and a second bending portion bent at a tail end of the second connecting rod to extend; and
the first bending portion and the second bending portion are both hingedly connected to the support rod.

2. The unmanned aerial vehicle according to claim 1, wherein the other end of the first rotation rod is hingedly connected to the support rod.

3. The unmanned aerial vehicle according to claim 2, wherein the first rotation rod comprises a mounting portion connected to the power apparatus, a first connecting rod extending from the mounting portion, and a first bending portion bent and extend from the first connecting rod; and one end of the support rod is hingedly connected to the first bending portion.

4. The unmanned aerial vehicle according to claim 3, wherein an angle between the first bending portion and the first connecting rod is 90°.

5. The unmanned aerial vehicle according to claim 1, wherein the unmanned aerial vehicle body is further provided with an accommodation groove used for accommodating the landing gear.

6. The unmanned aerial vehicle according to claim 1, wherein the unmanned aerial vehicle body is further provided with an accommodation groove used for accommodating the landing gear, the accommodation groove is formed by means of enclosure of a side wall of the unmanned aerial vehicle body, and the side wall is provided with an accommodation portion used for accommodating the power apparatus.

7. The unmanned aerial vehicle according to claim 6, wherein
the power apparatus comprises a body and a rotating shaft connected to the body, and the mounting portion is sleeved on the rotating shaft;
the landing gear further comprises a buffer apparatus, wherein the buffer apparatus comprises a first connecting body disposed on a surface that is of the mounting portion and that faces the body and an elastic component sleeved on the rotating shaft;
the first connecting body and the surface that is of the mounting portion and that faces the body jointly form a groove used for accommodating the elastic component, and the first connecting body has an opening that communicating with the groove; and one end of the first connecting rod is connected to the elastic component and located in a space enclosed by the opening and a surface that is of the body and that faces the mounting portion; and one end of the elastic component is connected to the first connecting rod, and the other end of the elastic component abuts against the first connecting body.

8. The unmanned aerial vehicle according to claim 7, wherein the first connecting body is further provided with a slot communicated with the groove, and the other end of the elastic component is located in the slot and abuts against the first connecting body.

9. The unmanned aerial vehicle according to claim 8, wherein the first connecting body is of an sector ring shape, so that the opening is of a fan shape and the groove is of an annular shape, and the slot extends in a tangential direction of the groove.

10. The unmanned aerial vehicle according to claim 6, wherein
the power apparatus comprises a body and a rotating shaft connected to the body, the mounting portion is connected to the rotating shaft, and the mounting portion comprises a first part and a second part that are buckled with the first part;
the landing gear further comprises a buffer apparatus, wherein the buffer apparatus comprises a first connecting body disposed on a surface that is of the first part and that faces the second part, a second connecting body disposed on a surface that is of the second part and that faces the first part, and an elastic component disposed between the first part and the second part;
the first connecting body and the first part jointly form a first groove, wherein a fixed column is disposed in the first groove, and the first connecting body further comprises a first opening that communicates with the first groove;
the second connecting body and the second part jointly form a second groove, wherein an accommodation hole used for accommodating the fixed column is formed in the second groove, and the second connecting body further comprises a second opening that communicates with the second groove;
the first part is buckled with the second part, so that the first groove and the second groove jointly form a groove used for accommodating the elastic component, and the first opening and the second opening jointly form an accommodation space; and
one end of the first rotation rod is accommodated in the accommodation space, and one end of the elastic component is connected to the first rotation rod and the other end of the elastic component abuts against the first connecting body.

11. The unmanned aerial vehicle according to claim 10, wherein the first connecting body is further provided with a slot communicated with the first groove, and the other end of the elastic component is located in the slot and abuts against the first connecting body.

12. The unmanned aerial vehicle according to claim 11, wherein the first connecting body is of an sector ring shape, so that the first opening is of a fan shape and the first groove is of an annular shape, and the slot extends in a tangential direction of the first groove.

13. The unmanned aerial vehicle according to claim 12, wherein the second connecting body and the first connecting body have a same shape.

14. The unmanned aerial vehicle according to claim 10, wherein the first connecting body is provided with a clamping column, the second connecting body is provided with a mounting hole engaged with the clamping column, and the first connecting body is buckled with the second connecting body by means of cooperation between the clamping column and the mounting hole.

15. The unmanned aerial vehicle according to claim 1, wherein the landing gear is further provided with a buffer apparatus.

16. The unmanned aerial vehicle according to claim 1, wherein an angle between the first bending portion and the first connecting rod is 90°; and an angle between the second bending portion and the second connecting rod is 90°.

17. The unmanned aerial vehicle according to claim 1, wherein projections of the first rotation rod and the second rotation rod onto a plane parallel to axes of the first rotation rod and the second rotation rod are not overlapped.

18. The unmanned aerial vehicle according to claim 1, wherein the linkage mechanism further comprises a connecting pin, an axis of the connecting pin is perpendicular to an axis of the second rotation rod, one end of the connecting pin is connected to the unmanned aerial vehicle body, and the other end of the connecting pin is hingedly connected to the second rotation rod.

19. The unmanned aerial vehicle according to claim 1, wherein the unmanned aerial vehicle body is further provided with accommodation grooves used for accommodating the landing gear.

20. The unmanned aerial vehicle according to claim 1, wherein the unmanned aerial vehicle body is further provided with accommodation grooves used for accommodating the landing gears, the accommodation grooves are formed by means of enclosure of a side wall of the unmanned aerial vehicle body, and the side wall is provided with accommodation portions used for accommodating power apparatus.

21. The unmanned aerial vehicle according to claim 1, wherein
the linkage mechanism comprises:
a cross rod, connected to the support rod, wherein
the unmanned aerial vehicle body is further provided with accommodation grooves used for accommodating the landing gear, and each accommodation groove comprises a vertical portion used for accommodating the first rotation rod, the second rotation rod, and the support rod and a horizontal portion used for accommodating the cross rod.

22. The unmanned aerial vehicle according to claim 21, wherein the accommodation grooves are formed by means of enclosure of a side wall of the unmanned aerial vehicle body, and the side wall is provided with accommodation portions used for accommodating power apparatus.

23. The unmanned aerial vehicle according to claim 21, wherein an angle between the first bending portion and the first connecting rod is 90°; and an angle between the second bending portion and the second connecting rod is 90°.

24. The unmanned aerial vehicle according to claim 21, wherein projections of the first rotation rod and the second rotation rod in a plane parallel to axes of the first rotation rod and the second rotation rod are not overlapped.

25. The unmanned aerial vehicle according to claim 21, wherein the linkage mechanism further comprises a connecting pin, an axis of the connecting pin is perpendicular to an axis of the second rotation rod, one end of the connecting pin is connected to the unmanned aerial vehicle body, and the other end of the connecting pin is hingedly connected to the second rotation rod.

26. The unmanned aerial vehicle according to claim 21, wherein the power apparatus comprises a body and a rotating shaft connected to the body, and the mounting portion is sleeved on the rotating shaft;

the landing gear further comprises a buffer apparatus;

the buffer apparatus comprises a first connecting body disposed on a surface that is of the mounting portion and that faces the body and an elastic component sleeved on the rotating shaft;

the first connecting body and the surface that is of the mounting portion and that faces the body jointly form a groove used for accommodating the elastic component, and the first connecting body has an opening that communicates with the groove; and one end of the first connecting rod is connected to the elastic component and in a space enclosed by the opening and a surface that is of the body and that faces the mounting portion; and one end of the elastic component is connected to the first connecting rod, and the other end of the elastic component abuts against the first connecting body.

27. The unmanned aerial vehicle according to claim 26, wherein the first connecting body is further provided with a slot communicated with the groove, and the other end of the elastic component is located in the slot and abuts against the first connecting body.

28. The unmanned aerial vehicle according to claim 27, wherein the first connecting body is of a sector ring shape, so that the opening is of a fan shape and the groove is of an annular shape, and the slot extends in a tangential direction of the groove.

29. The unmanned aerial vehicle according to claim 21, wherein the power apparatus comprises a body and a rotating shaft connected to the body, the mounting portion is connected to the rotating shaft, and the mounting portion comprises a first part and a second part that are fitted with each other;

the landing gear further comprises a buffer apparatus, wherein the buffer apparatus comprises a first connecting body disposed on a surface that is of the first part and that faces the second part, a second connecting body disposed on a surface that is of the second part and that faces the first part, and an elastic component disposed between the first part and the second part;

the first connecting body and the first part jointly form a first groove, wherein a fixed column is disposed in the first groove, and the first connecting body further comprises a first opening that communicates with the first groove;

the second connecting body and the second part jointly form a second groove, wherein an accommodation hole used for accommodating the fixed column is formed in the second groove, and the second connecting body further comprises a second opening that communicates with the second groove;

the first part is fitted with the second part, so that the first groove and the second groove jointly form a groove used for accommodating the elastic component, and the first opening and the second opening jointly form an accommodation space; and one end of the first rotation rod is accommodated in the accommodation space, and one end of the elastic component is connected to the first rotation rod and the other end of the elastic component abuts against the first connecting body.

30. The unmanned aerial vehicle according to claim 29, wherein the first connecting body is further provided with a slot communicated with the first groove, and the other end of the elastic component is located in the slot and abuts against the first connecting body.

31. The unmanned aerial vehicle according to claim 30, wherein the first connecting body is of an sector ring shape, so that the first opening is of a fan shape and the first groove is of an annular shape, and the slot extends in a tangential direction of the first groove.

32. The unmanned aerial vehicle according to claim 31, wherein the second connecting body and the first connecting body have a same shape.

33. The unmanned aerial vehicle according to claim 29, wherein the first connecting body is provided with a clamping column, the second connecting body is provided with a mounting hole engaged with the clamping column, and the first connecting body is fitted with the second connecting body by means of cooperation between the clamping column and the mounting hole.

34. The unmanned aerial vehicle according to claim 1, wherein the landing gear is further provided with a buffer apparatus.

\* \* \* \* \*